US012599133B2

(12) United States Patent
Tang et al.

(10) Patent No.: US 12,599,133 B2
(45) Date of Patent: Apr. 14, 2026

(54) USE OF TRIFLUENFURONATE FOR PREVENTION AND TREATMENT OF AGRICULTURAL PEST INSECTS AND MITES

(71) Applicant: SHANDONG UNITED PESTICIDE INDUSTRY CO., LTD., Taian (CN)

(72) Inventors: Jianfeng Tang, Taian (CN); Huiwei Chi, Taian (CN); Jianting Wu, Taian (CN); Longxiang Xu, Taian (CN); Gongwen Zhao, Taian (CN); Dongrong Li, Taian (CN); Jun Han, Taian (CN); Dandan Wang, Taian (CN); Xue Yuan, Taian (CN)

(73) Assignee: SHANDONG UNITED PESTICIDE INDUSTRY CO., LTD., Taian (CN)

( * ) Notice: Subject to any disclaimer, the term of this patent is extended or adjusted under 35 U.S.C. 154(b) by 462 days.

(21) Appl. No.: 18/003,579

(22) PCT Filed: Jun. 9, 2021

(86) PCT No.: PCT/CN2021/099094

§ 371 (c)(1),
(2) Date: Dec. 28, 2022

(87) PCT Pub. No.: WO2022/001601

PCT Pub. Date: Jan. 6, 2022

(65) Prior Publication Data

US 2023/0354810 A1 Nov. 9, 2023

(30) Foreign Application Priority Data

Jul. 1, 2020 (CN) ........................ 202010622002.X

(51) Int. Cl.

| | |
|---|---|
| ***A01N 43/08*** | (2006.01) |
| ***A01P 7/02*** | (2006.01) |
| ***A01P 7/04*** | (2006.01) |

(52) U.S. Cl.

CPC ................ *A01N 43/08* (2013.01); *A01P 7/02* (2021.08); *A01P 7/04* (2021.08)

(58) Field of Classification Search

CPC ... A01N 43/08; A01P 7/02; A01P 7/04; Y02A 50/30; C07D 307/33

See application file for complete search history.

(56) References Cited

FOREIGN PATENT DOCUMENTS

| | | | | |
|---|---|---|---|---|
| CN | 102027899 | A | | 4/2011 |
| CN | 106554334 | A | | 4/2017 |
| CN | 107372506 | A | | 11/2017 |
| CN | 107616169 | A | | 1/2018 |
| CN | 108633896 | A | | 10/2018 |
| CN | 108849896 | A | | 11/2018 |
| CN | 109006821 | A | | 12/2018 |
| CN | 109197887 | A | | 1/2019 |
| CN | 109221126 | A | | 1/2019 |
| JP | 2007246495 | A | * | 9/2007 |

OTHER PUBLICATIONS

Method for controlling disease and insect pest (Year: 2007).*

* cited by examiner

*Primary Examiner* — Snigdha Maewall
(74) *Attorney, Agent, or Firm* — NKL Law; Allen Xue

(57) ABSTRACT

Trifluenfuronate is used for the prevention and treatment of agricultural pest insects and mites. The trifluenfuronate can be configured as an agriculturally allowable emulsifiable concentrate, aqueous emulsion, aqueous solution, wettable powder, microemulsion, suspension, capsule suspension, or water dispersible granule, wherein the content of the trifluenfuronate in the dosage form is 1-80%. The trifluenfuronate has an outstanding effectiveness of control of agricultural pest insects and mites, and trifluenfuronate is a new compound, and there is no cross-resistance with existing products.

10 Claims, No Drawings

USE OF TRIFLUENFURONATE FOR PREVENTION AND TREATMENT OF AGRICULTURAL PEST INSECTS AND MITES

CROSS-REFERENCE TO RELATED APPLICATIONS

This application is a U.S. national stage entry of PCT international Application No. PCT/CN2021/099094, filed on Jun. 9, 2021, which claims the priority to the prior Application with the patent application No. 202010622002.X entitled "USE OF TRIFLOXYSTROBIN FOR PREVENTION AND TREATMENT OF AGRICULTURAL PEST INSECTS AND MITES" and filed with China National Intellectual Property Administration on Jul. 1, 2020, the content of which is incorporated herein by reference in its entirety.

TECHNICAL FIELD

The present disclosure belongs to the field of agricultural insecticidal and acaricidal agents, and relates to a product comprising trifluenfuronate as an active ingredient for preventing and controlling agricultural pest insects and mites, and to a preparation method therefor and use thereof.

BACKGROUND

In the cultivation process of crops, the effects of preventing and controlling agricultural pest insects and mites are directly associated with the yield and quality of the crops. At present, chemical controls are one of the important measures for preventing and controlling agricultural pest insects and mites and will remain irreplaceable to other control methods in preventing and controlling agricultural pest insects and mites in the future by virtue of their advantages of being efficient and having quick effects. However, as chemical agents have been continuously used, the 3R (resistance, resurgence and residue) problem of agricultural pest insects and mites is growing, and has been recognized as an urgent problem in need of solutions.

The search for a safe and efficient novel insecticidal and acaricidal agent without cross-resistance to existing agents is the most direct and effective way to solve the 3R problem in preventing and controlling agricultural pest insects and mites.

DESCRIPTION OF THE INVENTION

In order to remedy the defects of the prior art, the inventor of the present application finds that trifluenfuronate has activity on various agricultural pest insects and mites, can effectively inhibit female agricultural pest insects and mites from laying eggs, has outstanding activity on eggs of pest insects and mites and has no cross-resistance to existing agents; it is an excellent substitute product for solving the 3R problem of agricultural pest insects and mites. As an environment-friendly compound, trifluenfuronate (CAS: 2074661-82-6) is low in toxicity and is safe to use.

The present disclosure provides a trifluenfuronate-comprising insecticidal and acaricidal agent. After an effective amount of the insecticidal and acaricidal agent is applied to an area inhabited, supposedly inhabited or to be inhabited by pest insects and mites, the agent reduces the damage to crops caused by the pest insects and mites mainly by inhibiting female pest insects and mites from laying eggs, by inhibiting eggs of pest insects and mites from hatching, and so on; in addition, the agent also has a certain killing effect on adults and nymphs of pest insects and mites.

The purpose of the present disclosure is achieved by the following technical solutions:

Use of trifluenfuronate for preventing and controlling agricultural pest insects and mites.

According to the present disclosure, the agricultural pest insects and mites are at least one of phytophagous mites, *Bemisia tabaci* Gennadius, *Bradysia odoriphaga* Yang et Zhang, *Plutella xylostella* (Linnaeus) and *Mythimna separate* (Walker) (such as maize armyworm).

According to the present disclosure, the phytophagous mites are at least one of *Tetranychus cinnabarinus* (Boisduval), *Tetranychus urticae* Koch, *Panonychus citri* (McGregor) and *Tetranychus viennensis.*

According to the present disclosure, the trifluenfuronate has a structure as shown below:

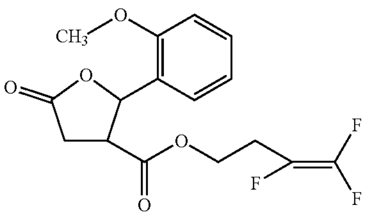 [SMILES: COc1ccccc1C1OC(=O)CC1C(=O)OCCC(F)=C(F)F]

The present disclosure also provides a trifluenfuronate-comprising insecticidal and acaricidal agent, wherein the trifluenfuronate-comprising insecticidal and acaricidal agent comprises trifluenfuronate and a solvent.

According to the present disclosure, the trifluenfuronate is added in an amount (the mass of trifluenfuronate in the insecticidal and acaricidal agent) of 1-80 wt %, e.g., 1-60 wt %, e.g., 1 wt %, 2 wt %, 5 wt %, 8 wt %, 10 wt %, 12 wt %, 15 wt %, 20 wt %, 25 wt %, 30 wt %, 35 wt %, 40 wt %, 45 wt %, 50 wt %, 55 wt %, 60 wt %, 70 wt % or 80 wt %.

According to the present disclosure, the trifluenfuronate-comprising insecticidal and acaricidal agent also comprises an emulsifier.

Specifically, the emulsifier is added in an amount (the mass of emulsifier in the insecticidal and acaricidal agent) of 3-30 wt %, e.g., 3 wt %, 5 wt %, 8 wt %, 10 wt %, 12 wt %, 15 wt %, 20 wt %, 25 wt %, 28 wt % or 30 wt %.

According to the present disclosure, the trifluenfuronate-comprising insecticidal and acaricidal agent can also comprise other adjuvants, and the other adjuvants can be at least one of thickeners, preservatives, defoamers, dispersants, stabilizers, wetting agents, penetrants and binders and the like; the other adjuvants can allow the trifluenfuronate-comprising insecticidal and acaricidal agent to be prepared for use in different circumstances, and to be processed into an emulsifiable concentrate, an aqueous emulsion, an aqueous solution, a wettable powder, a microemulsion, a suspension, a capsule suspension or a water dispersible granule that can be used in agriculture.

Illustratively, when the preduct of the present disclosure for preventing and controlling agricultural pest insects and mites (e.g., a trifluenfuronate-comprising insecticidal and acaricidal agent) is used to spray leaves and treat soil in the form of the emulsifiable concentrate, it comprises the following components:

trifluenfuronate: 1-60 wt %, an emulsifier: 5-20 wt %, and a mixed solvent for making up to 100 wt %.

The emulsifier is selected from one or more of pesticide emulsifier 100#, TX-10, pesticide emulsifier 500#, pesticide emulsifier 602#, OP500, OP10, Tween 80 and pesticide emulsifier 600#, preferably at least one of 5-8 wt % pesticide emulsifier 100#, 5-8 wt % pesticide emulsifier 600# and 3-8 wt % Tween 80.

The mixed solvent is a mixture of two or more of aromatic solvent naphtha, ethyl acetate and N-methylpyrrolidone, wherein preferably, aromatic solvent naphtha:N-methylpyrrolidone=1:1 (V/V).

Production process: The mixed solvent is added first, then an amount of trifluenfuronate is weighed out and fed, and the emulsifier is added. The mixture is stirred for 0.5 h to be fully homogenized and then continuously stirred in a preparation vessel for another 0.5 h. The content is determined, and the mixture is packed and sealed in separate double-barrier plastic bottles for storage.

Illustratively, when preduct of the present disclosure for preventing and controlling agricultural pest insects and mites (e.g., a trifluenfuronate-comprising insecticidal and acaricidal agent) is used to spray leaves and treat soil in the form of the the aqueous emulsion, it comprises the following components:

trifluenfuronate: 1-50 wt %, an emulsifier: 12-28 wt %, a solvent: 10-28 wt %, and water for making up to 100 wt %.

The emulsifier is selected from one or more of 7780, 7781T, 4103, Well201, TX-10, pesticide emulsifier 500#, pesticide emulsifier 602# and WellM30 and the like; preferably, the emulsifier is 5-15 wt % 7780 or 3-12 wt % 7781T.

The solvent is an aromatic hydrocarbon solvent or cyclohexanone and the like.

Production process: The solvent is added first, then an amount of trifluenfuronate is weighed out and fed, and the emulsifier is added. The mixture is stirred for 0.5 h to be fully homogenized and then continuously stirred in a preparation vessel for another 0.5 h. The mixed liquid is slowly added to water and the mixture is homogenized. The content is determined, and the mixture is packed and sealed in separate double-barrier plastic bottles, glass bottles, or aluminum bottles with an internal barrier coating for storage.

Illustratively, when preduct of the present disclosure for preventing and controlling agricultural pest insects and mites (e.g., a trifluenfuronate-comprising insecticidal and acaricidal agent) is used to spray leaves and treat soil in the form of the aqueous solution, it comprises the following components:

trifluenfuronate: 1-80 wt %, an emulsifier: 12-28 wt %, and water for making up to 100 wt %.

The emulsifier is betaine.

Production process: An amount of trifluenfuronate is weighed out and fed first, and the emulsifier is added, then water. The mixture is stirred for 0.5 h to be fully homogenized and then continuously stirred in a preparation vessel for another 0.5 h. The content is determined, and the mixture is packed and sealed in separate double-barrier plastic bottles, glass bottles, or aluminum bottles with an internal barrier coating for storage.

Illustratively, when preduct of the present disclosure for preventing and controlling agricultural pest insects and mites (e.g., a trifluenfuronate-comprising insecticidal and acaricidal agent) is used to spray leaves and treat soil in the form of the suspension, it comprises the following components:

trifluenfuronate: 1-80 wt %, an emulsifier: 1-20 wt %, a thickener: 0.01-1 wt %, a preservative: 0.1-1 wt %, a defoamer: 0.1-1 wt %, a solvent: 1-10 wt %, and water for making up to 100 wt %.

The emulsifier is a tristyrylphenol polyoxyethylene ether phosphate triethanolammonium salt, a ligninsulfonate or a naphthalenesulfonate; the thickener is xanthan gum, magnesium aluminum silicate or gelatin; the preservative is sodium benzoate or benzoic acid; the defoamers is selected from organosilicon additives; the solvent is selected from water, solvent naphtha, methyl oleate, turpentine oil and propylene carbonate.

Production process: The emulsifier, defoamer and water are mixed and homogenized, and then an amount of trifluenfuronate and an amount of the solvent are weighed out and fed. Then the mixture is homogenized and sanded. After the mixture is determined to be acceptable, the preservative and thickener are added, and then the mixture is homogenized. The content is determined, and the mixture is packed and sealed in separate double-barrier plastic bottles, glass bottles, or aluminum bottles with an internal barrier coating for storage.

Illustratively, when preduct of the present disclosure for preventing and controlling agricultural pest insects and mites (e.g., a trifluenfuronate-comprising insecticidal and acaricidal agent) is used to spray leaves and treat soil in the form of the microemulsion, it comprises the following components:

trifluenfuronate: 1-80 wt %, an emulsifier: 12-28 wt %, and a solvent: 1-10 wt %, and water for making up to 100 wt %.

The emulsifier is a tristyrylphenol polyoxyethylene ether phosphate triethanolammonium salt or fatty acid polyoxyethylene ether; the solvent is selected from water, olvent naphtha, methyl oleate, turpentine oil, propylene carbonate, cyclohexanone and decanamide.

Production process: The solvent is added first, then an amount of trifluenfuronate is weighed out and fed, and the emulsifier is added. The mixture is stirred for 0.5 h to be fully homogenized and then continuously stirred in a preparation vessel for another 0.5 h. Then the mixture is continuously stirred with water in the preparation vessel until it is homogenized.

The present disclosure also provides a method for preventing and controlling agricultural pest insects and mites, wherein the method comprises the following step:

applying by spraying leaves or by soil treatment the trifluenfuronate-comprising insecticidal and acaricidal agent described above to an area inhabited by pest insects and mites, an area supposedly inhabited by pest insects and mites or an area to be inhabited by pest insects and mites.

According to the present disclosure, the trifluenfuronate-comprising insecticidal and acaricidal agent described above is applied by spraying leaves or by soil treatment to an area inhabited by eggs of pest insects and mites, an area supposedly inhabited by eggs of pest insects and mites or an area to be inhabited by eggs of pest insects and mites.

Beneficial Effects of Present Disclosure

The present disclosure provides use of trifluenfuronate for preventing and controlling agricultural pest insects and mites. The trifluenfuronate can be prepared into an agriculturally acceptable emulsifiable concentrate, aqueous emulsion, aqueous solution, wettable powder, microemulsion, suspension, capsule suspension or water dispersible granule, wherein the trifluenfuronate content of the preparation form is 1-80%. In the present disclosure, trifluenfuronate is remarkably effective in preventing and controlling agricultural pest insects and mites; moreover, trifluenfuronate is a new compound without cross-resistance to existing products.

DETAILED DESCRIPTION

The present disclosure will be illustrated in further detail with reference to specific examples. It should be understood that the following embodiments are merely exemplary illustration and explanation of the present disclosure, and should not be construed as limiting the protection scope of the present disclosure. All techniques implemented based on the content of the present disclosure described above are encompassed within the protection scope of the present disclosure.

Unless otherwise stated, the experimental methods used in the following examples are conventional methods. Unless otherwise stated, the reagents, materials and the like used in the following examples are commercially available.

The decline rate of mite population and the control effect of treatment agent used in the following examples were calculated using the following formulas:

$$\text{Decline rate of mite population (\%)} = \frac{\text{Number of miles before application} - \text{Number of mites after application}}{\text{Number of mites before application}} \times 100\%$$

$$\text{Control effect (\%)} = \frac{\text{Decline rate of mite population in treated area} - \text{Decline rate of mite population in blank control area}}{1 - \text{decline rate of mite population in blank control area}} \times 100\%.$$

EXAMPLE 1

Trial for Toxicity to Phytophagous Mites

Oviposition inhibitory activity determination trial: A mother solution of the technical material with a mass concentration of 1 wt % was prepared with acetone for later use, and diluted with deionized water comprising 0.1 wt % Tween 80 to a series of trial concentrations. Fresh leaves of cowpea seedlings were selected and cut into round leaf disks with a diameter of about 5.0 cm. The leaf disks were placed in a plastic Petri dish with filter paper and degreased cotton spread in it. 5 mg/L and 10 mg/L treatment agents were applied to the back of the leaves with cotton swabs. An aqueous solution with the same solvent proportion was used as a control agent. After the agent liquid was naturally evaporated under indoor conditions, about 20 female adult mites aged 3-5 days were inoculated onto each leaf. Each treatment was repeated 5 times, about 100 mites were treated The mites were kept in the same conditions, and observed under a binocular dissecting microscope every 24 h over 6 consecutive days, and the number of laid eggs was recorded for each treatment. After the trial ended, the oviposition inhibition rate was calculated for each treatment.

$$\text{Oviposition inhibition rate} = \frac{\text{Number of laid eggs of blanks control group} - \text{Number of laid eggs of treatment group}}{\text{Number of laid eggs of blank control group}} \times 100\%$$

Mite egg hatching inhibitory activity determination trial: The trial was carried out using a leaf-immersing method. A mother solution of the technical material with a mass concentration of 1 wt % was prepared with acetone for later use, and diluted with deionized water comprising 0.1 wt % Tween 80 to a series of trial concentrations. A 1.2% aqueous agar was poured into a Petri dish with a diameter of 9 cm and cooled for later use. Twenty adult mites were selected and inoculated onto pepper leaves. After 2 days, the adult mites were removed, and the number of mite eggs is counted. The leaves with eggs were immersed in the prepared agent liquid for 10 s and then taken out. The leaves were placed in a Petri dish and moisturized. Each treatment was repeated 3 times. A 0.1 wt % aqueous solution of Tween 80 was used to set up a blank control. These treatments were placed in a biochemical incubator at 24±1° C. After mite eggs of the blank control group hatched, the trial results were checked, and the hatchability rate was calculated.

TABLE 1

Determination trial for inhibitory activity of trifluenfuronate against phytophagous adult female mites' oviposition

| Technical material | Target | Trial concentration (mg/L) | 6-day oviposition inhibition rate (%) |
|---|---|---|---|
| Trifluenfuronate | *Tetranychus cinnabarinus* | 1 | 47.27 |
| | Adult female mite | 5 | 77.72 |
| Etoxazole | | 1 | 35.67 |
| | | 5 | 66.79 |
| Trifluenfuronate | *Tetranychus urticae* | 1 | 50.39 |
| | Adult female mite | 5 | 76.98 |
| Etoxazole | | 1 | 35.92 |
| | | 5 | 69.16 |
| Trifluenfuronate | *Tetranychus viennensis* | 1 | 48.67 |
| | Adult female mite | 5 | 75.28 |
| Etoxazole | | 1 | 26.99 |
| | | 5 | 60.79 |

TABLE 1-continued

| Determination trial for inhibitory activity of trifluenfuronate against phytophagous adult female mites' oviposition | | | |
|---|---|---|---|
| Technical material | Target | Trial concentration (mg/L) | 6-day oviposition inhibition rate (%) |
| Trifluenfuronate | *Panonychus citri* | 1 | 50.99 |
| | Adult female mite | 5 | 77.82 |
| Etoxazole | | 1 | 37.59 |
| | | 5 | 65.39 |

The results are shown in Table 1. It can be seen that trifluenfuronate was effective in inhibiting the oviposition of the 4 types of adult female mites and reducing the number of laid eggs.

TABLE 2

| Determination trial for toxicity of trifluenfuronate to phytophagous mite eggs | | | | | |
|---|---|---|---|---|---|
| Technical material | Target | Regression equation | $LC_{50}$ (mg/L) | $LC_{90}$ (mg/L) | Correlation coefficient |
| Trifluenfuronate | *Tetranychus cinnabarinus* egg | y = 3.8781 + 1.8242x | 4.12 | 20.77 | 0.9879 |
| | *Tetranychus urticae* egg | y = 3.9457 + 1.8603x | 3.69 | 18.01 | 0.9696 |
| | *Tetranychus viennensis* egg | y = 3.6406 + 2.4121x | 3.66 | 12.44 | 0.9820 |
| | *Panonychus citri* egg | y = 4.1032 + 1.7364x | 3.28 | 17.97 | 0.9733 |
| Etoxazole | *Tetranychus cinnabarinus* egg | y = 3.0325 + 1.5514x | 18.54 | 124.23 | 0.9903 |
| | *Tetranychus urticae* egg | y = 3.1795 + 1.4561x | 17.79 | 135.01 | 0.9758 |
| | *Tetranychus viennensis* egg | y = 2.7219 + 1.8283x | 17.62 | 88.51 | 0.9863 |
| | *Panonychus citri* egg | y = 2.7454 + 1.6903x | 21.57 | 123.59 | 0.9888 |

The results are shown in Table 2. It can be seen that trifluenfuronate had remarkable activity on the 4 types of phytophagous mite eggs.

The procedure was the same as above except that the assay for toxicity to *Tetranychus cinnabarinus* eggs was carried out in different areas.

TABLE 3

| Determination trial for toxicity of trifluenfuronate to *Tetranychus cinnabarinus* eggs in different areas | | | |
|---|---|---|---|
| Technical material | Area | $LC_{50}$ (mg/L) | $LC_{90}$ (mg/L) |
| Trifluenfuronate | Fangcun, Taian | 3.89 | 21.95 |
| | Shouguang, Weifang | 4.11 | 19.37 |
| | Jiyang, Jinan | 3.92 | 20.94 |
| | Qihe, Dezhou | 3.79 | 15.62 |
| Etoxazole | Fangcun, Taian | 15.37 | 168.95 |
| | Shouguang, Weifang | 7.21 | 69.57 |
| | Jiyang, Jinan | 5.37 | 62.95 |
| | Qihe, Dezhou | 25.97 | 162.82 |

The results are shown in Table 3. It can be seen that trifluenfuronate has relatively stable activity on *Tetranychus cinnabarinus* eggs in these areas, different from etoxazole whose activity varies from one area to another. It can be speculated that trifluenfuronate has no cross-resistance to etoxazole. By comparing trifluenfuronate with commercially available acaricide products using the same trial method, it can be speculated that trifluenfuronate has no cross-resistance to existing acaricide agents.

EXAMPLE 2

Activity on Other Agricultural Pest Insect Eggs

*Bemisia tabaci* egg: A potting spray method was adopted. A mother solution of the technical material with a mass concentration of 1 wt % was prepared with acetone for later use, and a series of trial concentrations were prepared using a 0.1 wt % aqueous solution of Tween 80. Potted pepper plants growing at the same pace were selected. Every 6 potted pepper plants were counted as a treatment unit and placed in an insect-raising cage. About 500 silverleaf whiteflies were inoculated into each insect-raising cage and normally kept for 2 days, and then the adults were removed. After the agent was prepared, it was used to spray the pepper plants. After the spraying, the plants were placed in the insect-raising cages. A 0.1 wt % aqueous solution of Tween 80 was used to set up a blank control, and the blank control was placed in an insect-raising chamber at 25° C. After mite nymphs of the blank control group hatched, the number of nymphs in each treatment unit was counted, and the hatching inhibition rate was calculated.

*Bradysia odoriphaga* egg: The trial was carried out by using an agent liquid quantitative dropwise addition method. A mother solution of the technical material with a mass concentration of 1 wt % was prepared with acetone for later use, and a series of trial concentrations were prepared using a 0.1 wt % aqueous solution of Tween 80. *Bradysia odoriphaga* eggs aged 2 days were picked up. Each treatment unit comprised 20 eggs. The eggs were placed in a Petri dish with a diameter of 9 cm with filter paper spread in it. 600 μL of agent liquid was dropwise added with a pipette onto the eggs, and 600 μL of agent liquid onto the filter paper. Each treatment was repeated 3 times. A 0.1 wt % aqueous solution of Tween 80 was used to set up a blank control, and the blank control was placed in a biochemical incubator at 24±1° C. after treatment. Five days after application, the trial results were checked.

TABLE 4

Results of determination trial for toxicity of trifluenfuronate to other agricultural pest insect eggs

| Technical material | Target | Trial concentration (mg/L) | Hatchability inhibition (%) |
|---|---|---|---|
| Trifluenfuronate | *Bemisia tabaci* | 5 | 83.27 |
| | egg | 20 | 98.72 |
| | *Bradysia odoriphaga* | 5 | 81.29 |
| | egg | 20 | 95.34 |
| Pyriproxyfen | *Bemisia tabaci* | 5 | 43.67 |
| | egg | 20 | 86.79 |
| | *Bradysia odoriphaga* | 50 | 42.36 |
| | egg | 100 | 61.59 |

The results are shown in Table 4. It can be seen that trifluenfuronate had remarkable effects on the 2 types of agricultural pest insect eggs tested.

EXAMPLE 3

Activity on Other Agricultural Pest Insect Eggs

Diamondback moth egg: The trial was carried out using a leaf-immersing method. A mother solution of the technical material with a mass concentration of 1 wt % was prepared with acetone, and diluted with deionized water comprising 0.1 wt % Tween 80 to trial concentrations for later use. 1.2% agar was poured into a Petri dish with a diameter of 9 cm and cooled for later use. Two-leaf one-core radish seedlings were placed in the Petri dish when adult diamondback moths were at the great oviposition phase. After 1 day, the radish seedlings were taken out. Radish seedlings with 20-30 eggs in it were selected and immersed in the agent liquid for 10 s and then taken out, and the radish seedlings were placed in a Petri dish and moisturized. Each treatment was repeated 3 times. A 0.1 wt % aqueous solution of Tween 80 was used to set up a blank control, and the blank control was placed in an insect-raising chamber at 25° C. After larvae of the blank control group hatched, the trial results were checked, and the hatchability was calculated.

Maize armyworm egg: The trial was carried out using a leaf-immersing method. A mother solution of the technical material with a mass concentration of 1 wt % was prepared with acetone, and diluted with deionized water comprising 0.1 wt % Tween 80 to trial concentrations for later use. 1.2% agar was poured into a Petri dish with a diameter of 9 cm and cooled for later use. Two-leaf one-core corn seedlings were placed in the Petri dish when adult maize armyworms were at the great oviposition phase. After 1 day, the radish seedlings were taken out. Corn seedlings with 20-30 eggs in it were selected and immersed in the agent liquid for 10 s and then taken out, and the corn seedlings were placed in a Petri dish and moisturized. Each treatment was repeated 3 times. A 0.1 wt % aqueous solution of Tween 80 was used to set up a blank control, and the blank control was placed in an insect-raising chamber at 25° C. After larvae of the blank control group hatched, the trial results were checked, and the hatchability was calculated.

TABLE 5

Results of determination trial for toxicity of trifluenfuronate to other agricultural pest insect eggs

| Trial agent | Target | Trial concentration (mg/L) | Hatchability inhibition (%) |
|---|---|---|---|
| Trifluenfuronate | Diamondback | 5 | 73.64 |
| | moth egg | 20 | 88.27 |
| | Maize armyworm | 5 | 83.67 |
| | egg | 20 | 92.29 |
| Lufenuron | Diamondback | 5 | 59.10 |
| | moth egg | 20 | 75.00 |
| | Maize armyworm | 5 | 22.57 |
| | egg | 20 | 58.36 |

The results are shown in Table 5. It can be seen that trifluenfuronate had remarkable effects on the 2 types of agricultural pest insect eggs tested.

EXAMPLE 4

Field Efficacy Trial

Trial crop: cotton

Control subject: *Tetranychus cinnabarinus*

Trial method: A field efficacy trial was carried out according to "Guidelines for the Field Efficacy Trials". The trial dose of the control agent was the recommended dose. Clear water treatment was set as a blank control. Each dose treatment was repeated 4 times. Randomized block arrangement was carried out. The branches and both sides of the leaves of the plants were sprayed evenly with the agent, so the mites were fully exposed to the agent liquid. The insect population base was investigated before application. A fixed-point investigation method was adopted after application. In each plot, 2 plants were investigated, each plant was marked with five points: east, south, west, north and middle, 1 branch tip was investigated per point, 5 leaves were investigated per branch tip, and a total of 50 leaves were investigated per plot. The number of living adult mites and nymphs was recorded. The results were investigated 14 days after application. The number of active mites on the leaves was examined and recorded. The decline rate of mite population and the control effect of treatment agent were calculated.

TABLE 6

Results of field efficacy trial of trifluenfuronate against *Tetranychus cinnabarinuss*

| Trial agent | Trial concentration (mg/L) | 14-day control effect (%) |
|---|---|---|
| 5% emulsifiable concentrate of trifluenfuronate | 50 | 83.64 |
| 5% aqueous emulsion of trifluenfuronate | 50 | 79.21 |
| 5% aqueous solution of trifluenfuronate | 50 | 85.32 |
| 5% suspension of trifluenfuronate | 50 | 84.13 |
| 5% microemulsion of trifluenfuronate | 50 | 79.77 |
| 110 g/L suspension of etoxazole | 50 | 56.79 |

The results are shown in Table 6. Trifluenfuronate was effective in preventing and controlling *Tetranychus cinnabarinuss* on cotton plants.

EXAMPLE 5

Field Efficacy Trial

Trial crop: cucumber
Control subject: *Tetranychus urticae*
Trial method: A field efficacy trial was carried out according to "Guidelines for the Field Efficacy Trials". The trial dose of the control agent was the recommended dose. Clear water treatment was set as a blank control. Each dose treatment was repeated 4 times. Randomized block arrangement was carried out. The branches and both sides of the leaves of the plants were sprayed evenly with the agent, so the mites were fully exposed to the agent liquid. The insect population base was investigated before application. A fixed-point investigation method was adopted after application. In each plot, 2 plants were investigated; each plant was marked with five points: east, south, west, north and middle, 1 branch tip was investigated per point, 5 leaves were investigated per branch tip, and a total of 50 leaves were investigated per plot. The number of living adult mites and nymphs was recorded. The results were investigated 14 days after application. The number of active mites on the leaves was examined and recorded. The decline rate of mite population and the control effect of treatment agent were calculated.

TABLE 7

Results of field efficacy trial of trifluenfuronate against *Tetranychus urticaes*

| Trial agent | Trial concentration (mg/L) | 14-day control effect (%) |
|---|---|---|
| 5% emulsifiable concentrate of trifluenfuronate | 50 | 83.26 |
| 5% aqueous emulsion of trifluenfuronate | 50 | 80.23 |
| 5% aqueous solution of trifluenfuronate | 50 | 86.41 |
| 5% suspension of trifluenfuronate | 50 | 85.33 |
| 5% microemulsion of trifluenfuronate | 50 | 80.72 |
| 110 g/L suspension of etoxazole | 50 | 60.37 |

The results are shown in Table 7. Trifluenfuronate was effective in preventing and controlling *Tetranychus urticaes* on cucumber plants.

EXAMPLE 6

Field Efficacy Trial

Trial crop: citrus
Control subject: *Panonychus citri*
Trial method: A field efficacy trial was carried out according to "Guidelines for the Field Efficacy Trials". The trial dose of the control agent was the recommended dose. Clear water treatment was set as a blank control. Each dose treatment was repeated 4 times. Randomized block arrangement was carried out. The branches and both sides of the leaves of the plants were sprayed evenly with the agent, so the mites were fully exposed to the agent liquid. The insect population base was investigated before application. A fixed-point investigation method was adopted after application. In each plot, 2 plants were investigated, each plant was marked with five points: east, south, west, north and middle, 1 branch tip was investigated per point, 5 leaves were investigated per branch tip, and a total of 50 leaves were investigated per plot. The number of living adult mites and nymphs was recorded. The results were investigated 14 days after application. The number of active mites on the leaves was examined and recorded. The decline rate of mite population and the control effect of treatment agent were calculated.

TABLE 8

Results of field efficacy trial of trifluenfuronate against *Panonychus citris*

| Trial agent | Trial concentration (mg/L) | 14-day control effect (%) |
|---|---|---|
| 5% emulsifiable concentrate of trifluenfuronate | 50 | 80.21 |
| 5% aqueous emulsion of trifluenfuronate | 50 | 79.34 |
| 5% aqueous solution of trifluenfuronate | 50 | 85.37 |
| 5% suspension of trifluenfuronate | 50 | 83.45 |
| 5% microemulsion of trifluenfuronate | 50 | 79.99 |
| 110 g/L suspension of etoxazole | 50 | 55.91 |

The results are shown in Table 8. Trifluenfuronate was effective in preventing and controlling *Panonychus citris* on citrus plants.

EXAMPLE 7

Field Efficacy Trial

Trial crop: hawthorn
Control subject: *Tetranychus viennensis*
Trial method: A field efficacy trial was carried out according to "Guidelines for the Field Efficacy Trials". The trial dose of the control agent was the recommended dose. Clear water treatment was set as a blank control. Each dose treatment was repeated 4 times. Randomized block arrangement was carried out. The branches and both sides of the leaves of the plants were sprayed evenly with the agent, so the mites were fully exposed to the agent liquid. The insect population base was investigated before application. A fixed-point investigation method was adopted after application. In each plot, 2 plants were investigated; each plant was marked with five points: east, south, west, north and middle, 1 branch tip was investigated per point, 5 leaves were investigated per branch tip, and a total of 50 leaves were investigated per plot. The number of living adult mites and nymphs was recorded. The results were investigated 14 days after application. The number of active mites on the leaves was examined and recorded. The decline rate of mite population and the control effect of treatment agent were calculated.

TABLE 9

Results of field efficacy trial of trifluenfuronate against *Tetranychus viennensis*

| Trial agent | Trial concentration (mg/L) | 14-day control effect (%) |
|---|---|---|
| 5% emulsifiable concentrate of trifluenfuronate | 50 | 79.08 |
| 5% aqueous emulsion of trifluenfuronate | 50 | 83.76 |
| 5% aqueous solution of trifluenfuronate | 50 | 81.84 |
| 5% suspension of trifluenfuronate | 50 | 88.83 |
| 5% microemulsion of trifluenfuronate | 50 | 87.53 |
| 110 g/L suspension of etoxazole | 50 | 72.64 |

The results are shown in Table 9. Trifluenfuronate was effective in preventing and controlling *Tetranychus viennensis.*

During the observation starting from the application to the end of the investigation, the preparations of the examples were not found to cause visible phytotoxicity symptoms in the crops. The crops grew well after application, which indicates that trifluenfuronate was able to kill pest insect eggs when applied at the trial concentrations, thereby continuously reducing the insect population and reducing the damage to the crops.

It should be understood that the examples described above are some examples of the present disclosure provided only for better understanding of the examples of the present disclosure, and are not all the examples of the present disclosure. In practical applications, numerous different examples can be obtained by adjusting the content of each component described above in the present disclosure and the way the components are combined. These examples are all within the scope of the present disclosure.

The embodiments of the present disclosure have been described above. However, the present disclosure is not limited to the embodiments described above. Any modification, equivalent, improvement and the like made without departing from the spirit and principle of the present disclosure shall fall within the protection scope of the present disclosure.

The invention claimed is:

1. A method for preventing and controlling an agricultural pest for an agricultural plant, comprising:

applying an effective amount of an agent by spraying leaves of the agricultural plant with the agent or by applying the agent to a soil the agricultural plant is planted in or is to be planted in, wherein the agricultural pest is one or more selected from phytophagous mites, *Bemisia tabaci, Bradysia odoriphaga, Plutella xylostella*, and *Mythimna separata*, and the insecticidal and acaricidal agent comprises trifluenfuronate of formula;

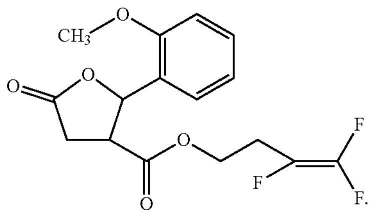 [SMILES: COc1ccccc1C1OC(=O)CC1C(=O)OCCC(F)=C(F)F]

2. The method as claimed in claim 1, wherein the agent is applied by spraying leaves or by soil treatment to an area inhabited by eggs of pest insects and mites, an area supposedly inhabited by eggs of pest insects and mites or an area to be inhabited by eggs of pest insects and mites.

3. The method as claimed in claim 1, wherein the phytophagous mites are one or more selected from *Tetranychus cinnabarinus, Tetranychus urticae, Panonychus citri*, and *Tetranychus viennensis.*

4. The method as claimed in claim 1, wherein the agent comprises trifluenfuronate and a solvent.

5. The method as claimed in claim 4, wherein the content of trifluenfuronate is 1-80 wt %.

6. The method as claimed in claim 1, wherein the agent further comprises an emulsifier, and the content of the emulsifier is 3-30 wt %.

7. The method as claimed in claim 1, wherein the agent further comprises one or more adjuvants selected from thickeners, preservatives, antifoaming agents, dispersants, stabilizers, wetting agents, penetrants, and binders.

8. The method as claimed in claim 1, wherein the agent is an emulsifiable concentrate, an aqueous emulsion, an aqueous solution, a wettable powder, a microemulsion, a suspension, a capsule suspension, or a water dispersible granule.

9. The method as claimed in claim 1, the agricultural pest is one or more phytophagous mites.

10. The method as claimed in claim 9, the phytophagous mites selected from *Tetranychus cinnabarinus, Tetranychus urticae, Panonychus citri*, and *Tetranychus viennensis.*

* * * * *